United States Patent
Molstad et al.

(10) Patent No.: US 7,031,097 B1
(45) Date of Patent: Apr. 18, 2006

(54) SYSTEMS AND METHODS FOR USING NOISE MEASUREMENT TRACKS WITH SERVOPOSITIONING SIGNALS

(75) Inventors: Richard W. Molstad, St. Paul, MN (US); Douglas W. Johnson, Stillwater, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/775,884

(22) Filed: Feb. 10, 2004

Related U.S. Application Data

(63) Continuation-in-part of application No. 10/052,696, filed on Jan. 18, 2002, now Pat. No. 6,950,269.

(51) Int. Cl.
*G11B 5/584* (2006.01)

(52) U.S. Cl. ..................... 360/77.12; 360/48
(58) Field of Classification Search .................. 360/48, 360/69, 70, 72.2, 73.09, 75, 77.01, 77.12, 360/78.01–78.02, 31
See application file for complete search history.

(56) References Cited

U.S. PATENT DOCUMENTS

| 5,689,384 A | 11/1997 | Albrecht et al. |
| 5,930,065 A | 7/1999 | Albrecht et al. |
| 6,021,013 A | 2/2000 | Albrecht et al. |
| 6,700,729 B1 * | 3/2004 | Beck et al. .................... 360/76 |

* cited by examiner

*Primary Examiner*—David Hudspeth
*Assistant Examiner*—Jason Olson
(74) *Attorney, Agent, or Firm*—Eric D. Levinson

(57) ABSTRACT

Servopositioning data is written onto a linear recording medium such that a position error signal (PES) is intentionally created. The signal substantially resembles a conventional time based servo pattern, but is insensitive to transverse position. In a preferred embodiment, the signal at a zero-azimuth, i.e., an angle sufficiently small in value such that there is no significant PES signal associated with the transverse motion.

10 Claims, 5 Drawing Sheets

Prior Art

SYSTEMS AND METHODS FOR USING NOISE MEASUREMENT TRACKS WITH SERVOPOSITIONING SIGNALS

CROSS REFERENCE TO RELATED APPLICATION

This is a continuation-in-part of application Ser. No. 10/052,696 filed Jan. 18, 2002, now U.S. Pat. No. 6,950,269 which is assigned to the assignee of this application, and is copending.

FIELD OF THE INVENTION

This invention concerns systems and methods for using servopositioning signals in linear recording media, especially the use of a dedicated noise measurement track to enable accurate measurement of baseline noise in the system.

BACKGROUND OF THE INVENTION

Modern data storage systems use servopositioning (or, "servo") systems to guide their recording and playback components with respect to a recording medium, and thus enable high track density, which increases data storage capacity. Errors in the ability to follow the servopositioning signals on the medium can cause unacceptable reductions in storage capacity, recording/playback rates, and other parameters that are important to consumers (and thus to system manufacturers). For example, magnetic tape drives such as the IBM model 3570 and drives known under the names "Ultrium" and "Accelis" as described by the Linear Tape Open consortium use timing based servopositioning systems to accomplish these objectives.

SUMMARY OF THE INVENTION

The invention provides a method for writing servopositioning data onto a recording medium such that a position error signal is intentionally created at any desired magnitude and frequency. This provides valuable diagnostic information for drive manufacturers and consumers.

Specifically, one aspect of the invention is a linear recording medium that comprises a series of parallel servo transitions at a zero or near-zero azimuth angle. The distances between adjacent transitions may be modulated as a function of location of the transitions on the medium. Preferably, but not necessarily, the adjacent parallel transitions are immediately adjacent to each other. The medium could be a magnetic recording medium, a tape recording medium, or most preferably, a magnetic tape recording medium. Another aspect of the invention is a system for intentionally generating position error signal in a data recording drive. This comprises the combination of the recording medium just described and a recording drive. The drive, which is designed to expect signals at a substantially non-zero azimuth angle (and essentially no modulation of distance between immediately adjacent parallel servo transitions on the medium), detects the signal created by the zero azimuth angle transitions (and, if present, the modulation of distance between transitions) through a servo read head. This signal may be used for a variety of independent purposes, such as: generating a position error signal in the data recording drive; measuring response of the servopositioning system, and especially the response to steps or other patterns in the modulated signal magnitude and/or frequency; simulating rapid transient motion of the linear recording medium; disabling a data write function in the drive if the position error signal exceeds a so-called "stop write" limit; and evaluating performance of the drive (e.g., by comparing the detected position error signal to an expected value).

BRIEF DESCRIPTION OF THE DRAWINGS

The accompanying drawings show a particular embodiment of the invention as an example, and are not intended to limit the scope of the invention.

DETAILED DESCRIPTION

In general terms, the invention can be embodied in an entire system of data recording and playback, including the combination of a drive and a linear recording medium; or as only the recording medium portion of such a system; or as methods for accomplishing certain tasks with such as recording medium, either alone or in combination with such a drive. Thus, while the following description focuses on the preferred embodiment of magnetic recording drives and magnetic recording tape compatible with such drives, this is not a limitation on the scope of the invention. Similarly, the following description focuses on the recording medium portion of the invention solely as a matter of convenience, and thus it should be understood to include other embodiments of the invention depending on the circumstances, such as combinations of the medium and drive, and methods of using such combinations or relevant portions of them. In that vein, the term "transition" should be understood broadly, especially when non-magnetic recording principles are involved.

Figure 1:
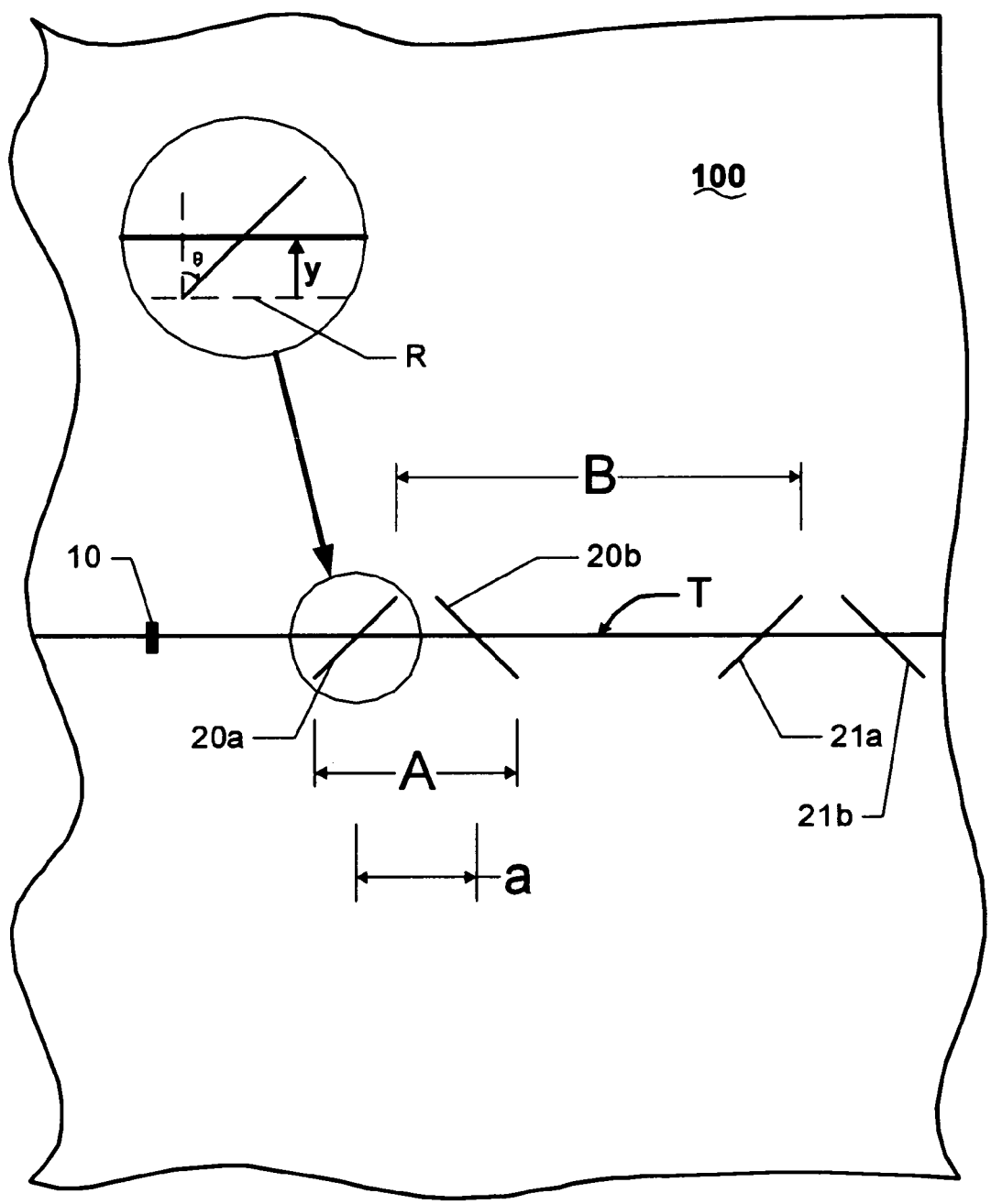
FIG. 1 is a schematic view of a data recording system.

FIG. 1 is a schematic view of a portion of a linear recording medium (such as a magnetic tape) in operation with a suitably compatible drive (not shown). The function of any track following servo system for linear recording drives is to provide servo read head lateral position information in a feedback loop so that the data read and write heads can be maintained on the proper track. Timing based servo systems, such as those described in U.S. Pat. No. 5,689,384 (the entire contents of which is incorporated by reference), utilize the time between servo pattern events as a measure of Position Error Signal (PES). The direction of media motion (e.g., "down" the length of a linear recording tape) is typically orthogonal to the direction controlled by the servo (i.e., across the width of the tape, transverse to the length). Thus, the servo pattern must translate timing (or distance at a constant tape speed) in one direction to displacement in another.

One such pattern is shown in FIG. 1. The servo transducer is a read head (or the read portion of a read/write head) 10 that is much narrower than the angled, non-parallel transitions of the servo pattern, 20a and 20b. (In this and all embodiments of the invention, a servo transition, such as that labeled 20a, shown as a single signal, should be understood to also represent a burst of multiple parallel transitions.)

Servo read head 10 traverses the medium 100 in the y direction (i.e., transverse to the direction of tape motion), reading transitions 20a and 20b and thus indicating the position of the servo read head 10 with respect to the desired trackline T in a conventional manner. For a constant velocity along the recording medium in the longitudinal direction, and depending on the transverse location of servo read head 10, the width of the servo pattern in the longitudinal direction, a, changes. The distance a is geometrically related to the head lateral displacement, y, from reference line R (or a line parallel to R according to known principles).

Figure 2:
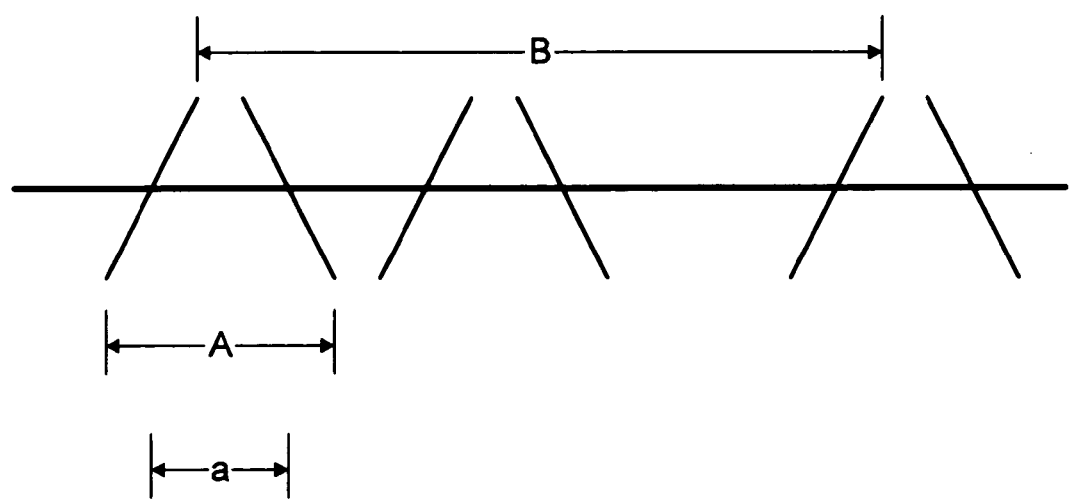
FIG. 2 is a schematic view of an alternative embodiment of a data recording system.

Because media speed perturbations would introduce error in the measurement, additional servo patterns are located on the medium so that repeated measurements can be made. Specifically, a third transition 21a is placed adjacent to, and parallel to, the first transition 20a at a distance B between successive parallel transitions, and a fourth transition 21b is similarly included. It should be noted that FIG. 1 shows immediately adjacent parallel transitions as a matter of convenience, and because it is the preferred embodiment, but as indicated in FIG. 2, in the general case it is only necessary that pairs of adjacent parallel transitions be selected, not necessarily immediately adjacent parallel transitions. The remainder of this discussion presumes the preferred embodiment only for convenience.

The relationship between y, $t_a$, $t_b$, and the geometry of the pattern, where $t_a$ and $t_b$ are the times to traverse distances a and B, respectively, are:

$$y = \frac{\left(A - B\frac{t_a}{t_b}\right)}{2\tan(\theta)} \quad (1)$$

where $\theta$ is the angle the parallel transitions 20a, 21a make with the transverse direction.

Both $t_a$ and $t_b$ are easily measured. If distance B is fixed, read velocity compensation is possible within the bandwidth allowed by the spacing distance. Servoposition patterns in which B is constant are known, including those disclosed in U.S. Pat. Nos. 5,689,384; 5,930,065; and 6,021,013 (each Albrecht et al.).

By contrast, it is possible to rely on the exact opposite of the Albrecht et al. requirement that B be held constant over the length of the recording medium. That is, modulation of the B distance over (at least some of) the length of medium 100 to simulate PES. By precisely controlling B spacing while writing the series of parallel servo transitions on the medium, PES error at any frequency or magnitude can be generated. Conventional drives assume B is constant, and therefore will read a servo pattern having modulated variation in B as vertical motion of the recording medium. In this manner, a special servo writer can "write in" PES error at pre-determined levels. A good approximation of the PES error caused by a 1% variation in B spacing is:

$$PES = 1\% \cdot \left(\frac{A}{2\tan(\theta)} - Y_t\right) \quad (2)$$

where A is as shown in FIG. 2 and $Y_t$ is the target position on the servo pattern.

For example, if A=70 µm, $\theta$=6 degrees and $Y_t$=0 (at the bottom of the pattern), the PES error is 3.3 µm per percent error in B spacing.

Figure 3:
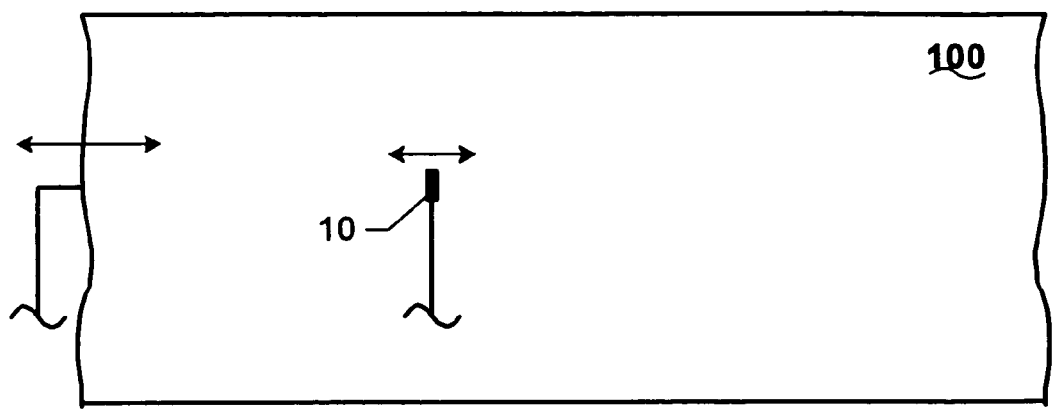
FIG. 3 is a schematic view of another embodiment of a data recording system.
Figure 3:
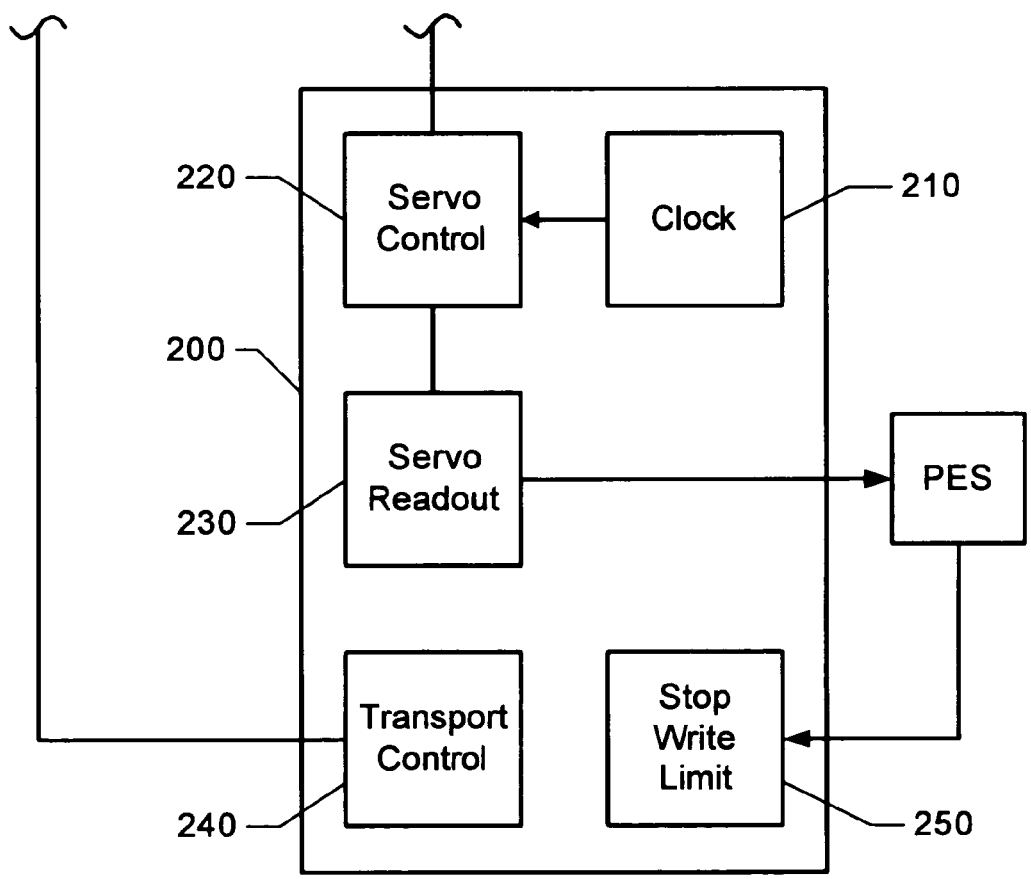

Referring to FIG. 3, modulation of the B distance may be accomplished by any means that adjusts the relative velocity of the servo write head (or the write portion of a read/write head) 10 to the medium 100. This will produce a PES signal from the servo readout circuit 230 of a drive 200. One technique adjusts the clock 210 that serves the servo write head timing circuit 220. This has the advantage of not requiring a change in the normal behavior of the servo read head 10 and medium transport control 240, which is to move the medium at constant velocity relative to the servo read head. Another technique adjusts either the longitudinal or vertical position of the medium, but this requires sophisticated control of the medium transport mechanism. Similarly, adjusting either the longitudinal or vertical position of the servo write head 10 could be attempted, as indicated by the arrows adjacent to it in FIG. 3.

As compared to a baseline value of PES, there are at least three broad categories of intentionally introduced changes in PES value that may be implemented. One is a step response pattern, in which the PES value changes from the baseline value to some other value, and remains at the latter for a relatively long duration (e.g., as compared to the time required to measure the PES value). The second is a pulse response pattern, in which the PES value changes from the baseline value to some other value, then returns to the baseline magnitude during a fairly short time. The third is a pattern in which the PES value changes over time in a cycle having constant or variable amplitude and/or constant or variable frequency. Other patterns of changing PES value are also possible, as is introducing PES as a function of frequency and considering the performance of the system and/or media by analyzing the resultant Bode plot of PES (or residual PES) as a function of frequency.

A recording medium written with pre-determined PES error may be used in the following ways. First, by placing steps in the PES, a drive servo developer can measure the step response of the drive servo system. Second, PES steps of various magnitudes can simulate rapid transient motion of the medium for use in developing error recovery procedures. These can also be used to determine the "stop write limit," which is the amount of PES allowed by the drive before the data write function is disabled in an otherwise conventional manner. Third, by increasing PES stress (magnitude and/or frequency) over at least a portion of the length of the medium, drives from various manufacturers can be evaluated and ranked for servo performance. Fourth, media can be written with barely tolerable PES stress that can be used by drive manufacturers in a diagnostic test, such as a final test performed before shipping drives to vendors or customers.

Because the PES error is a function of $Y_t$ (vertical position of the servo read element on the servo pattern), targeting different positions on the pattern changes the magnitude of PES error. Using the example above, the PES error would be reduced to 1.7 µm per % of spacing error if the target position were 163 µm up from the base. Thus, by choosing different servo positions, it is possible to modify the magnitude of the error by nearly 2 to 1.

EXAMPLE

Figure 4:
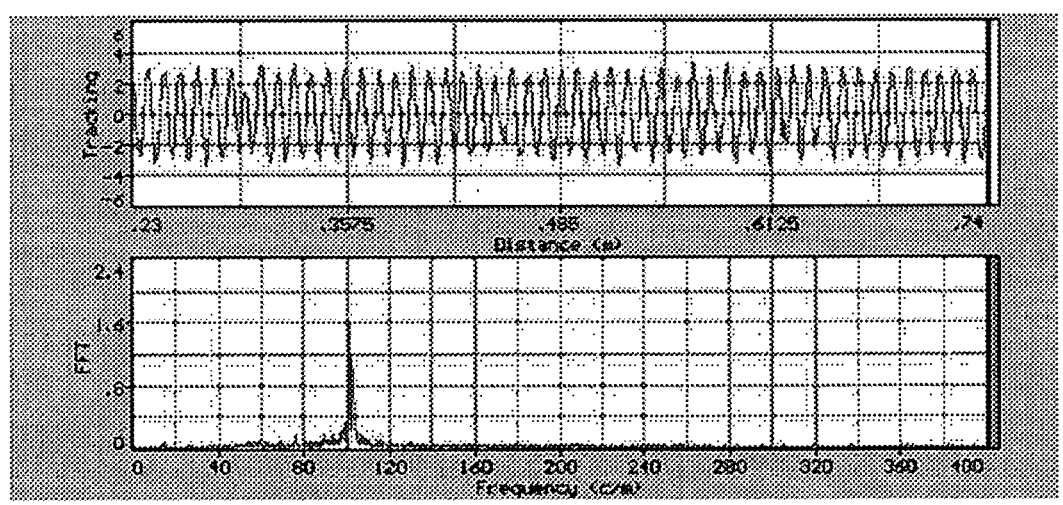
FIG. 4 is a display of the result of implementing into a data recording ystem the features described in the Example below.

A commercially available "Ultrium generation 1" magnetic tape recording drive was used with a compatible magnetic recording tape, modified as necessary according to the principles described above. Adjusting the clock in the servo write head timing circuit in an open-loop manner generated a varying PES signal. The tape was written to generate 3 micrometers of PES error at a frequency of 100 cycles/meter. FIG. 4 shows the results. The upper portion of the figure shows consistently varying position error signal at the ±3 micrometer levels, while the fast Fourier transformed signal appearing in the lower portion of the figure shows the 100 cycle/meter signal clearly distinguishable over background levels, at a signal magnitude of 1.5 micrometer peak (3 micrometer peak-to-peak). This demonstrated the feasibility of producing a signal capable of being detected by a servopositioning head according to the description above.

Noise Measurement

With the discussion above serving as background for the use of a tape and PES measurement as described, the following describes embodiments of the invention that involve baseline noise in the PES subsystem in a drive or servo writer drive. The concept of Signal-to-Noise Ratio, or SNR, is pervasive in communications theory and practice. In the prior art, it has been difficult, if not impossible, to accurately estimate the baseline noise in the PES subsystem in a drive or servo writer drive.

Figure 5:
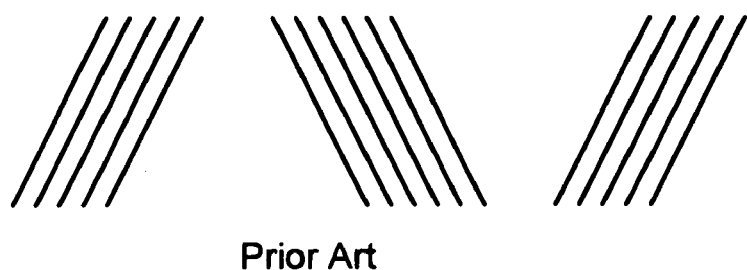
FIG. 5 is a schematic representation of servo patterns in the prior art (upper portion of the Figure), and also as employed in an additional embodiment of the invention (lower portion of the Figure).
Figure 5:
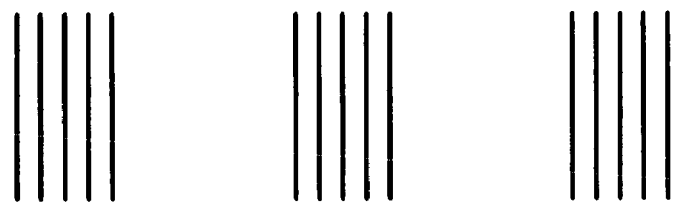

In general terms, the method of the invention uses an additional signal that substantially resembles a conventional time-based servo pattern (preferably the one specified for the Ultrium system described above), but that is also insensitive to transverse position. The preferred technique to accomplish this is by writing the otherwise conventional pattern at zero azimuth, instead of the standard azimuth angle of ±6 degrees. It should be understood that "zero azimuth" in this context means an angle that is sufficiently small in value such that there is no significant PES signal associated with the transverse motion; "near zero azimuth" refers to angles greater than zero azimuth angles but yet substantially below the standard azimuth angle of ±6 degrees. Referring to FIG. 5, zero azimuth angle is shown schematically in the lower portion of the figure, and the standard azimuth angle is shown schematically in the upper portion of the figure labeled "Prior Art."

The drive, when reading this zero azimuth pattern, will be sensitive only to the basic system noise present in the system. Transverse tape motion, if any, will not cause any change in the timing of the pattern, and therefore any PES signal reported from the PES subsystem will reflect the recording, playback, and processing noise of the subsystem only. The PES signal read from the drive can be compared to an expected value to determine if there is any significance to the value. This value, independent of the units chosen, can be used for two purposes: first, to enable determination of proper system functioning; second, to reveal the ultimate limits of the given PES servo scheme, which is a component of the calculation of the amount of tracking error "budgeted" or designed into the drive.

Figure 6:
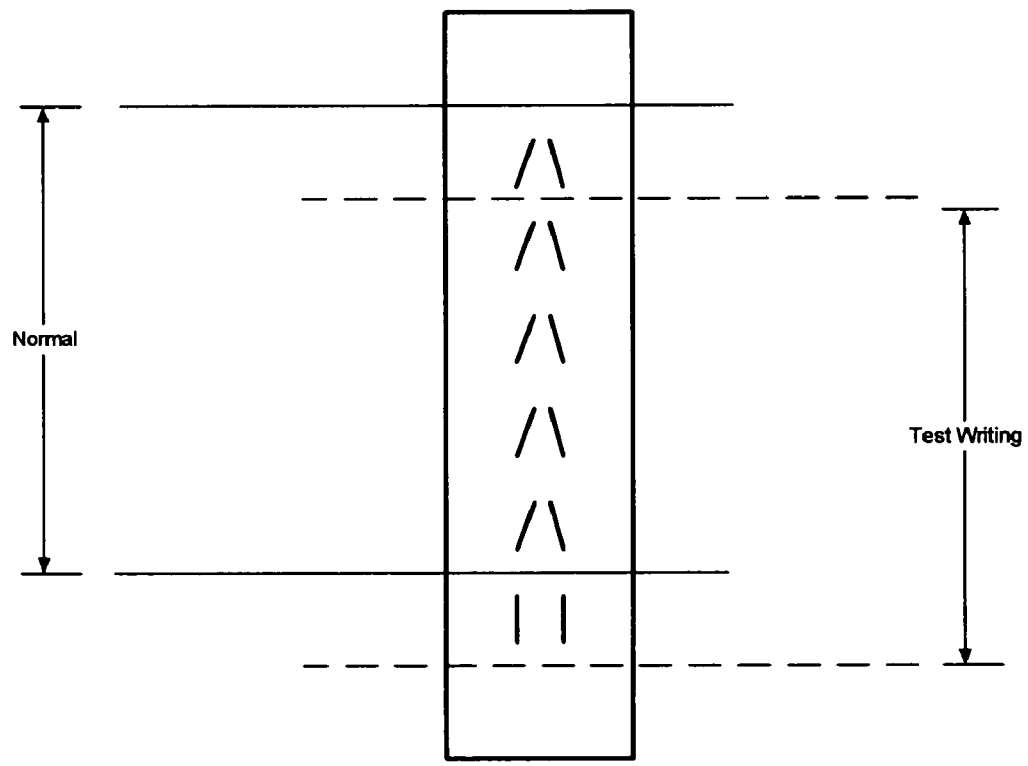
FIG. 6 is a schematic representation of various approaches to the design of a servowriting head or heads that may be employed with the invention.

As indicated schematically in FIG. 6, recording of this dedicated additional signal can be accomplished in various embodiments of the invention with any of a number of head architectures. The pair of heads 601 and 602 represent a combination of a conventional head 601 implementing the scheme of the upper portion of FIG. 5 and a dedicated special purpose servo write head 602 implementing the scheme of the lower portion of FIG. 5. Such a combination can be used to sequentially or intermittently write both conventional and non-conventional signals on the same or adjacent region(s) of tape. Head 603 represents the combination of a standard head on which a zero azimuth gap feature has replaced one of the conventional gap features. The zero azimuth gap is illustrated in the lowest position, but it could be located in any of the six positions shown, and conventional head displacement techniques can be used to move the zero azimuth gap to the location of another servo band if desired.

Head 604 illustrates that multiple non-zero azimuth gaps can be included in a single head; in general, the number and location of such gaps is not a limitation on the scope of the invention. If it is desired to retain use of all of the non-zero azimuth gaps (e.g., the six illustrated by way of example only in head 601), then one or more additional zero azimuth gap(s) can be added to instead of simply replacing a non-zero azimuth gap with a zero azimuth gap, and using whatever head displacement techniques are suggested by the configuration chosen.

Regardless of number or location, the non-zero or "on-azimuth" recording will differ from the conventional signal recorded at the (preferably) 6 degree angle, especially in terms of its high-density response, due to the off-azimuth condition itself. The "on-azimuth" test recording will have more high frequency energy unless special precautions are taken in the recording of the test signal. One suitable precaution is to increase the duration of the write current pulse. A second precaution would be to increase the zero azimuth record gap width.

Figure 7:
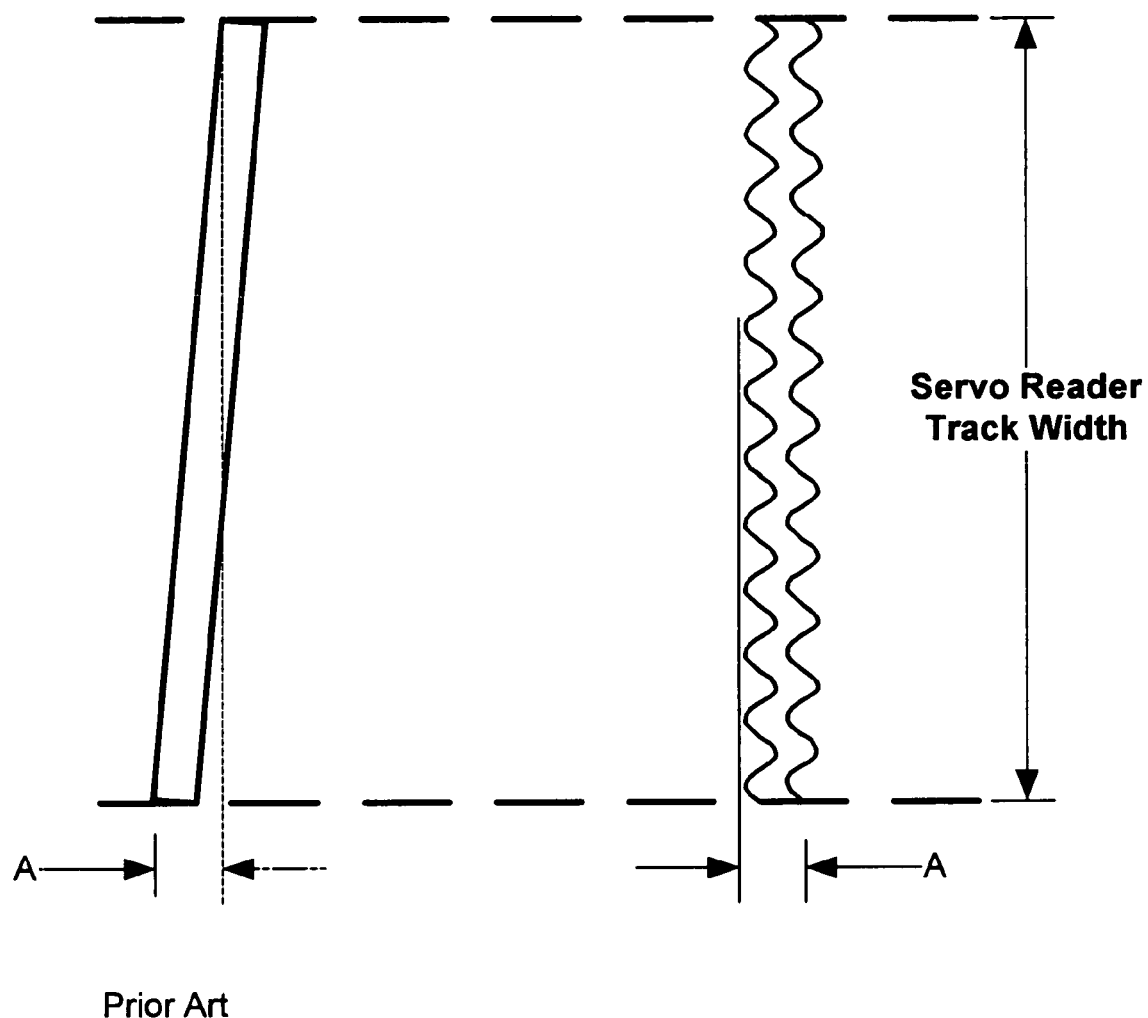
FIG. 7 is a schematic representation of an alternative embodiment of the invention.

As illustrated in FIG. 7, a third precaution comprises "roughening" of the gap edge profile to simulate the off-azimuth condition. In this technique, a non-straight (as illustrated for purposes of example only, a sawtooth) gap with an amplitude of (for example) 0.5 to 1 µm and a similar spatial wavelength is acceptable. A sawtooth signal is most preferred. In general, the peak-to-peak amplitude of the roughness, A, in terms of the slant angle θ and the servo read head track width $T_w$ is given by $$A = \left(\frac{T_w}{2}\right)\tan\theta$$

Where λ, the cross-track wavelength of the roughness, is approximately equal to $T_w$. For example, if $T_w$=5 micrometers and θ=6, then A=263 nanometers or approximately 10 microinches.

The invention claimed is:

1. A linear recording medium, for use with a recording drive designed to read pairs of non-parallel servo transitions having substantially no modulation of distance between immediately adjacent pairs of parallel servo transitions on the medium, comprising a series of pairs of parallel servo transitions, wherein for each of the pairs of parallel servo transitions there is a corresponding pair of non-parallel servo transitions, wherein the linear recording medium further comprises modulated distances between adjacent pairs of the parallel servo transitions as a function of location of the pairs of parallel servo transitions on the medium, the modulated distances being encoded to define position error signals such that the recording drive designed to expect essentially no modulated distances between adjacent parallel servo transitions on the medium will generate the position error signals.

2. The medium of claim 1, in which the linear recording medium is a magnetic recording medium.

3. The medium of claim 1, in which the linear recording medium is a tape recording medium.

4. A linear recording medium, for use with a recording drive designed to read pairs of non-parallel servo transitions having substantially no modulation of distance between immediately adjacent pairs of parallel servo transitions on the medium, comprising a series of pairs of parallel servo transitions, wherein for each of the pairs of parallel servo transitions there is a corresponding pair of non-parallel servo transitions, wherein the transitions of the pairs of parallel servo transitions define roughened gap edge profiles.

5. The medium of claim 4, in which the roughened gap edge profiles define peak-to-peak roughening amplitude, A, equal to $$\left(\frac{T_W}{2}\right)$$

tan θ, where θ is a slant angle and the profile has a cross track wavelength λ approximately equal to a servo read head track width $T_w$.

6. A system for intentionally generating position error signal in a data recording drive designed to read pairs of non-parallel servo transitions having substantially no modulation of distance between immediately adjacent pairs of parallel servo transitions, comprising in combination:
   a) a linear recording medium comprising pairs of parallel servo transitions, wherein for each of the pairs of parallel servo transitions there is a corresponding pair of non-parallel servo transitions; and
   b) a servo read head connected to the drive to read at least one of the pairs of parallel servo transitions and the pairs of non-parallel servo transitions,
wherein the medium further comprises modulated differences between adjacent pairs of the parallel servo transitions as a function of location of the pairs of parallel servo transitions on the medium, the modulated distances being encoded to define position error signals such that the data recording drive designed to expect essentially no modulated distances between adjacent parallel servo transitions on the medium will generate the position error signals.

7. The system of claim 6, in which the transitions in the pairs of parallel servo transitions define roughened gap edge profiles.

8. The system of claim 7, in which the roughened gap edge profiles define peak-to-peak roughening amplitude, A, equal to $$\left(\frac{T_W}{2}\right)$$

tan θ, where θ is a slant angle and the profile has a cross track wavelength λ approximately equal to a servo read head track width $T_w$.

9. A method of evaluating performance of a linear recording drive designed to read pairs of parallel servo transitions without modulation of distance between immediately adjacent pairs of parallel servo transitions on a linear recording medium compatible with the drive, comprising:
   a) providing a linear recording medium, upon at least a portion of which are:
      (i) first pairs of parallel servo transitions; and
      (ii) for each of the first pairs of parallel servo transitions, corresponding second pairs of non-parallel servo transitions; and
   b) using the drive to read a position error signal from the second pairs of non-parallel servo transitions at each transverse location on the medium;
   c) comparing the position error signal to an expected value;
   d) using the drive to read system noise from the first pairs of parallel servo transitions; and
   e) comparing the system noise to an expected value,
wherein the transitions in the first pairs of parallel servo transitions define roughened gap edge profiles.

10. The method of claim 9, in which the roughened gap edge profiles define peak-to-peak roughening amplitude, A, equal to $$\left(\frac{T_W}{2}\right)$$

tan θ, where θ is a slant angle and the profile has a cross track wavelength λ approximately equal to a servo read head track width $T_w$.

* * * * *